United States Patent [19]

Raw et al.

[11] 3,939,299

[45] Feb. 17, 1976

[54] ALUMINIUM ALLOY CONDUCTOR WIRE

[75] Inventors: Peter Michael Raw, Harrow, England; Rees Jenkin Llewellyn, Burnaby, Canada

[73] Assignee: British Insulated Callender's Cables Limited, London, England

[22] Filed: July 31, 1974

[21] Appl. No.: 493,532

[30] Foreign Application Priority Data

Aug. 9, 1973 United Kingdom............... 37869/73

[52] U.S. Cl..................... 174/23 R; 29/193; 75/148; 174/40 R; 174/110 R; 174/110 F; 174/126 CP

[51] Int. Cl.²...................... H01B 1/02; H02G 15/20

[58] Field of Search.......... 174/126 R, 126 CP, 128, 174/130, 102 A, 113, 40 R, 23 R, 110 R, 131 A, 131 R, 102 R, 107, 110 F; 29/183.5, 193, 180; 75/138, 148

[56] References Cited

UNITED STATES PATENTS

| | | | |
|---|---|---|---|
| 3,261,908 | 7/1966 | Roche et al. | 174/130 X |
| 3,513,251 | 5/1970 | Schoerner | 174/110 R |
| 3,513,252 | 5/1970 | Schoerner | 174/110 R |
| 3,647,939 | 3/1972 | Schoerner | 174/128 |
| 3,795,760 | 3/1974 | Raw et al. | 174/126 CP X |
| 3,806,326 | 4/1974 | Medrick et al. | 174/128 X |
| 3,813,481 | 5/1974 | Adams | 174/128 X |
| 3,842,185 | 10/1974 | Raw et al. | 174/23 R |
| R27,830 | 12/1973 | Schoerner | 174/110 R X |
| R27,832 | 12/1973 | Schoerner | 174/110 R |
| R28,078 | 7/1974 | Schoerner | 174/110 R X |

*Primary Examiner*—Arthur T. Grimley
*Attorney, Agent, or Firm*—Buell, Blenko & Ziesenheim

[57] ABSTRACT

A conductor wire is composed of an aluminium alloy consisting of between 98.0 and 99.5 weight percent aluminium; between 0.3 and 1.0, preferably 0.4 to 0.6, weight percent iron; between 0.16 and 1.2, preferably 0.3 to 1.0, weight percent silicon; and trace quantities of conventional impurities. The conductor wire has a higher tensile strength than wires of known aluminium alloys which contain similar quantities of iron and is especially suitable for use in telecommunication cables, wiring cables and overhead conductors. The conductor wire may have a cladding of copper or copper alloy.

14 Claims, 2 Drawing Figures

ALUMINIUM ALLOY CONDUCTOR WIRE

This invention relates to elongate members of aluminium alloy suitable for use in forming a conductor, or an element of a multi-element conductor, of an electric cable or an electric insulated wire, all such elongate elements hereinafter, for convenience, being included in the generic term "conductor wire".

It is an object of the present invention to provide an improved conductor wire of an aluminum alloy containing iron as the principal alloying constituent which has a higher tensile strength than wires of known aluminium alloys which contain similar quantities of iron.

According to the invention our improved conductor wire is composed of an aluminium alloy consisting of between 98.0 and 99.5 weight percent aluminium; between 0.3 and 1.0 weight percent iron; between 0.16 and 1.2 weight percent silicon; and trace quantities of conventional impurities.

Preferably the silicon content lies in the range of 0.3 to 1.0 weight percent and the iron content lies in the range 0.4 to 0.6 weight percent. For ease of manufacture we prefer especially for the silicon content to lie in the range 0.3 to 0.5 weight percent and for the iron content to be approximately 0.5 weight percent.

By conventional impurities is meant impurities that are normally found in aluminium in its commercially pure form, either (a) as impurities not removed in the refining process or (b) as residues of a substance added during the refining process for the purpose of neutralising or removing some undesirable impurities. In normal circumstances the amount of impurities (a) present in the alloy does not exceed 0.025 weight percent and the amount of residual impurities (b) present in the alloy does not exceed 0.015 weight percent.

As compared with conductor wires of known aluminium alloys containing similar quantities of iron but smaller quantities of silicon, a conductor wire in accordance with the present invention of the same diameter has significantly improved tensile strength and the improved tensile properties of our improved conduction wire are illustrated by the following results achieved with a conductor wire of a known aluminium alloy (Alloy A) having a diameter of 0.5 mm and with conductor wires in accordance with the present invention (Alloys B, C, D, E, F, G, H, J, K, L, M and N) of the same diameter, as drawn, and after annealing each hard-drawn wire at several different temperatures.

TABLE I

| | Iron Content Wt % | Silicon Content Wt % |
|---|---|---|
| Alloy A | 0.50 | 0.041 |
| Alloy B | 0.38 | 0.18 |
| Alloy C | 0.50 | 0.23 |
| Alloy D | 0.54 | 0.29 |
| Alloy E | 0.48 | 0.46 |
| Alloy F | 0.91 | 0.54 |
| Alloy G | 0.61 | 0.60 |
| Alloy H | 0.35 | 0.62 |
| Alloy J | 0.46 | 0.65 |
| Alloy K | 0.42 | 0.91 |
| Alloy L | 0.87 | 1.12 |
| Alloy M | 0.60 | 1.14 |
| Alloy N | 0.33 | 1.16 |

TABLE II

| Alloy | Temperature of Annealing Temp. (°C) | Electrical Conductivity (% IACS) | 0.1% Proof Stress (MN/m²) | Tensile Strength (MN/m²) | Elongation % on 250 mm |
|---|---|---|---|---|---|
| A | As drawn | 61.4 | 177 | 221 | 1.6 |
| B | " | 61.3 | 182 | 230 | 0.7 |
| C | " | 60.8 | 176 | 227 | 2.0 |
| D | " | 59.7 | 197 | 261 | 2.3 |
| E | " | 59.6 | 168 | 236 | 1.7 |
| F | " | 58.2 | 190 | 283 | 2.8 |
| G | " | 57.7 | 201 | 285 | 2.5 |
| H | " | 57.6 | 203 | 286 | 2.2 |
| J | " | 58.5 | 196 | 258 | 3.0 |
| K | " | 56.7 | 209 | 269 | 3.1 |
| L | " | 54.7 | 224 | 300 | 2.2 |
| M | " | 55.0 | 213 | 310 | 5.5 |
| N | " | 54.9 | 217 | 301 | 3.0 |
| A | 200 | 62.3 | 143 | 164 | 0.4 |
| B | " | 62.8 | 134 | 164 | 0.7 |
| C | " | 62.2 | 128 | 151 | 0.6 |
| D | " | 62.0 | 135 | 168 | 0.7 |
| E | " | 59.7 | 122 | 148 | 1.0 |
| F | " | 60.5 | 138 | 179 | 1.1 |
| G | " | 60.7 | 141 | 186 | 1.3 |
| H | " | 60.8 | 153 | 195 | 1.8 |
| J | " | 60.7 | 123 | 157 | 3.6 |
| K | " | 60.1 | 133 | 166 | 6.2 |
| L | " | 59.2 | 159 | 202 | 3.6 |
| M | " | 60.0 | 162 | 209 | 6.4 |
| N | " | 60.0 | 173 | 214 | 3.7 |
| A | 225 | 62.6 | 137 | 144 | 0.4 |
| B | " | 63.0 | 113 | 131 | 0.5 |
| C | " | 62.1 | 118 | 135 | 0.9 |
| D | " | 61.9 | 117 | 146 | 0.8 |
| E | " | 61.8 | 114 | 137 | 4.5 |
| F | " | 61.2 | 116 | 151 | 4.9 |
| G | " | 61.3 | 123 | 163 | 5.1 |
| H | " | 61.8 | 131 | 168 | 3.8 |
| J | " | 61.5 | 114 | 148 | 8.9 |
| K | " | 60.9 | 120 | 156 | 7.0 |
| L | " | 60.4 | 134 | 180 | 7.5 |
| M | " | 60.8 | 134 | 186 | 5.0 |
| N | " | 61.4 | 151 | 197 | 3.4 |
| A | 250 | 62.3 | 104 | 121 | 4.9 |
| B | " | 63.2 | 94 | 119 | 14.5 |

TABLE II-continued

| Alloy | Temperature of Annealing Temp. (°C) | Electrical Conductivity (% IACS) | 0.1% Proof Stress (MN/m²) | Tensile Strength (MN/m²) | Elongation % on 250 mm |
|---|---|---|---|---|---|
| C | " | 62.4 | 88 | 118 | 17.0 |
| D | " | 62.3 | 101 | 130 | 7.3 |
| E | " | 62.2 | 91 | 126 | 16.0 |
| F | " | 61.5 | 91 | 134 | 15.5 |
| G | " | 61.8 | 98 | 140 | 11.0 |
| H | " | 62.5 | 114 | 150 | 8.4 |
| J | " | 61.6 | 87 | 128 | 16.0 |
| K | " | 61.6 | 88 | 133 | 16.0 |
| L | " | 60.5 | 107 | 156 | 11.5 |
| M | " | 61.5 | 106 | 157 | 13.0 |
| N | " | 61.7 | 110 | 159 | 9.0 |
| A | 262.5 | 62.4 | 96 | 116 | 14.0 |
| B | " | 63.1 | 88 | 116 | 16.5 |
| C | " | 62.6 | 82 | 114 | 20.0 |
| D | " | 62.4 | 94 | 127 | 11.0 |
| E | " | 61.5 | 83 | 123 | 16.0 |
| F | " | 61.5 | 84 | 130 | 21.0 |
| G | " | 61.7 | 90 | 135 | 16.0 |
| H | " | 62.4 | 104 | 141 | 11.0 |
| J | " | 62.0 | 83 | 128 | 18.0 |
| K | " | 61.8 | 84 | 132 | 17.0 |
| L | " | 60.9 | 96 | 149 | 10.0 |
| M | " | 61.2 | 97 | 146 | 14.0 |
| N | " | 62.0 | 95 | 146 | 11.5 |
| A | 275 | 62.9 | 79 | 107 | 26.0 |
| B | " | 63.0 | 64 | 108 | 24.5 |
| C | " | 62.4 | 70 | 101 | 25.0 |
| D | " | 62.5 | 83 | 122 | 15.5 |
| E | " | 62.6 | 74 | 121 | 19.5 |
| F | " | 61.7 | 72 | 126 | 18.0 |
| G | " | 61.5 | 79 | 127 | 19.5 |
| H | " | 62.5 | 89 | 132 | 14.0 |
| J | " | 61.8 | 77 | 124 | 20.0 |
| K | " | 62.3 | 77 | 126 | 21.5 |
| L | " | 60.4 | 87 | 143 | 16.5 |
| M | " | 61.3 | 83 | 138 | 22.0 |
| N | " | 62.2 | 83 | 135 | 20.0 |
| A | 300 | 62.9 | 50 | 103 | 31.5 |
| B | " | 63.0 | 48 | 109 | 30.0 |
| C | " | 62.2 | 55 | 110 | 29.0 |
| D | " | 62.2 | 61 | 115 | 24.5 |
| E | " | 62.3 | 62 | 116 | 22.5 |
| F | " | 61.7 | 60 | 124 | 27.0 |
| G | " | 61.7 | 65 | 125 | 23.5 |
| H | " | 62.6 | 67 | 121 | 24.5 |
| J | " | 61.0 | 63 | 119 | 26.0 |
| K | " | 61.8 | 66 | 120 | 26.0 |
| L | " | 60.6 | 71 | 135 | 17.0 |
| M | " | 61.4 | 68 | 130 | 21.0 |
| N | " | 61.8 | 66 | 124 | 22.0 |

The greater improvement in tensile strength of conductor wires of the present invention as compared with that of conductor wires of the known aluminium alloy occurs with the silicon content of the aluminium alloy lying in the upper part of the specified range of 0.16 to 1.2 weight percent.

Although conductor wires of the present invention in the annealed condition show a slight loss in electrical conductivity as compared with an annealed conductor wire of a known aluminium alloy containing a similar quantity of iron and a smaller quantity of silicon, the improvement in tensile strength for a given elongation renders our improved conductor wires especially suitable for use in telephone cables and in other cables and conductors where a high tensile strength is desirable and a high electrical conductivity is not of primary importance.

In addition, since in some instances conductor wires of the present invention in the hard drawn condition, though having a lower electrical conductivity than a conductor wire of a known aluminium alloy containing a similar quantity of iron but a smaller quantity of silicon, have a tensile strength that is about 30% greater than that of the hard drawn conductor wire of the known alloy, hard drawn conductor wires of the present invention are especially suitable for use in overhead electric conductors where tensile strength is a primary consideration.

Other cables for which our improved conductor wires are suitable include cables of the kind generally known as wiring cables and used, for example, for the wiring of buildings, vehicles, aircraft, switchboards, equipment and machinery comprising one or more conductor wires covered with insulating and/or sheathing material. Where our improved conductor wire is to be used in a wiring cable the conductor wire may have an outer cladding of copper or copper alloy bonded to it, the cladding constituting the minor proportion of the cross-sectional area of the conductor wire. The provision of a copper cladding ensures that the conductor wire can be satisfactorily jointed or terminated by those methods normally employed for copper conductors.

The conductor wire of the present invention may be prepared by any of the known processes for preparing aluminium alloy wire but we prefer to prepare our aluminium alloy, immediately rolling the bar down to rod form, drawing the rod to the required wire size, with one or more than one intermediate anneal if required, and finally annealing the wire.

The invention also includes an electric insulated conductor comprising at least one conductor wire as hereinbefore defined provided with at least one covering layer of insulating material, for instance an extruded layer of plastic insulating material, and the invention further includes an electric cable comprising at least one insulated conductor, the insulated conductor or at least one of the insulated conductors comprising at least one conductor wire as hereinbefore described provided with at least one covering layer of insulating material and, enclosing the insulated conductor or conductors, an outer protective sheath.

The invention further includes a telecommunication cable comprising a multiplicity of insulated conductors, each conductor comprising a conductor wire as hereinbefore defined. The conductors may be insulated with solid or cellular plastics material and the interstices between the insulated conductors and between them and a surrounding waterproof sheath from end to end of the cable length may be filled with a water-impermeable medium of a grease-like nature.

The invention still further includes an overhead electric conductor comprising at least one conductor wire as hereinbefore defined.

The invention will be further illustrated by a description, by way of example, of a telecommunication cable and of an overhead electric conductor each incorporating conductor wires of the present invention with reference to the accompanying drawings, in which.

Figure 1:
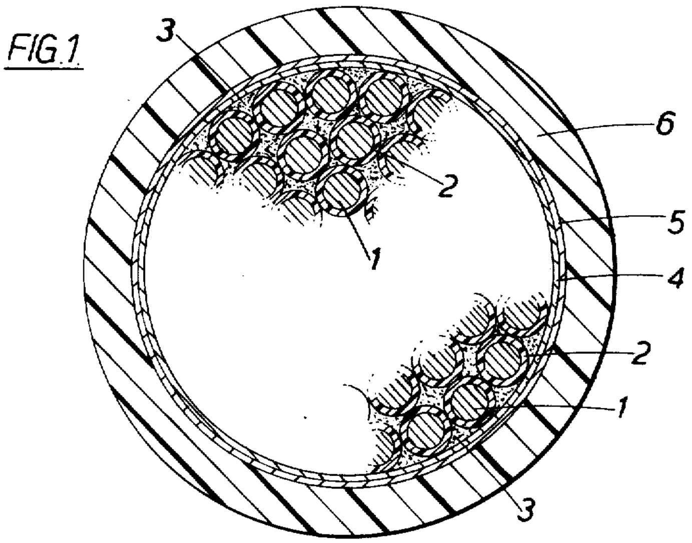
FIG. 1 is a cross-sectional end view of the telecommunication cable.

The telecommunication cable shown in FIG. 1 comprises a hundred pairs of insulated conductors each consisting of partly annealed aluminium alloy wire 1 of nominal diameter 0.50 mm and an insulating covering 2 of extruded cellular polyethylene of radial thickness 0.14 mm. The aluminium alloy of each wire 1 consists of 99.05 weight percent aluminium; 0.48 weight percent iron; 0.46 weight percent silicon; and trace quantities of conventional impurities. Wire 1 has an electrical conductivity of 62.0% IACS, and 0.1% proof stress of 102.5 $MN/m^2$, a tensile strength of 133 $MN/m^2$ and elongation on 250 mm of 10%. The assembly of insulated conductors is surrounded by a longitudinally applied, transversely folded paper tape 4, a longitudinally applied, transversely folded aluminium tape 5 and an extruded polyethylene sheath 6. The interstices between the insulated conductors and between the insulated conductors and the paper tape 4 are filled throughout the length of the cable with a water-impermeable medium 3 comprising highly refined petroleum jelly.

Figure 2:
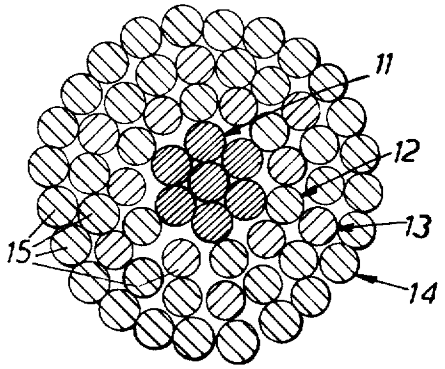
FIG. 2 is a cross-sectional end view of the overhead electric conductor.

The overhead electric conductor shown in FIG. 2 is of overall diameter 42.5 mm and comprises a stranded core 11 of seven steel wires each of diameter 4.72 mm which is surrounded by three stranded layers 12, 13 and 14 of round hard drawn aluminium alloy wires 15 of diameter 4.72 mm, the direction of lay of the wires of each layer being opposite to that of the wires in the or each adjacent layer. The aluminium alloy of each wire 15 consists of 98.53 weight percent aluminium; 0.91 weight percent iron; 0.54 weight percent silicon and trace quantities of conventional impurities.

What we claim as our invention is:

1. A conductor wire composed of an aluminium alloy consisting of between 98.0 and 99.5 weight percent aluminium; between 0.3 and 1.0 weight percent iron; between 0.16 and 1.2 weight percent silicon; and trace quantities of conventional impurities.

2. A conductor as claimed in claim 1, wherein the silicon content of the aluminium alloy lies in the range 0.3 to 0.5 weight percent and the iron content is approximately 0.5 weight percent.

3. A conductor wire as claimed in claim 1, which has at least one covering layer of insulating material.

4. A conductor wire composed of an aluminium alloy consisting of between 98.0 and 99.5 weight percent aluminium; between 0.3 and 1.0 weight percent iron; between 0.16 and 1.0 weight percent silicon; and trace quantities of conventional impurities.

5. A conductor wire composed of an aluminium alloy consisting of between 98.0 and 99.5 weight percent aluminium; between 0.4 and 0.6 weight percent iron; between 0.3 and 1.0 weight percent silicon; and trace quantities of conventional impurities.

6. A conductor wire as claimed in claim 3, having bonded to its outer surface a cladding of copper or a copper alloy, the cladding constituting the minor proportion of the cross-sectional area of the conductor wire.

7. A conductor wire consisting of an inner part (constituting the major proportion of the cross-sectional area of the conductor wire) composed of an aluminium alloy consisting of between 98.0 and 99.5 weight percent aluminium; between 0.16 and 1.2 weight percent silicon; and trace quantities of conventional impurities, and, bonded to the inner part, an outer part (constituting the minor proportion of the cross-sectional area of the conductor wire) of copper or a copper alloy.

8. An electric cable comprising at least one conductor, the conductor or at least one of the conductors comprising at least one conductor wire composed of an aluminium alloy consisting of between 98.0 and 99.5 weight percent aluminium; between 0.3 and 1.0 weight percent iron; between 0.16 and 1.2 weight percent silicon; and trace quantities of conventional impurities, provided with at least one covering layer of insulating material and, enclosing the insulated conductor or insulated conductors, an outer protective sheath.

9. An electric cable comprising at least one conductor, the conductor or at least one of the conductors comprising at least one conductor wire composed of an aluminium alloy consisting of between 98.0 and 99.5 weight percent aluminium; between 0.4 and 0.6 weight percent iron; between 0.3 and 1.0 weight percent silicon; and trace quantities of conventional impurities, provided with at least one covering layer of insulating material and, enclosing the insulated conductor or insulated conductors, an outer protective sheath.

10. A telecommunication cable comprising a multiplicity of insulated conductors, each conductor comprising a conductor wire composed of an aluminium alloy consisting of between 98.0 and 99.5 weight percent aluminium; between 0.3 and 1.0 weight percent iron; between 0.16 and 1.2 weight percent silicon; and trace quantities of conventional impurities, and a waterproof sheath enclosing the insulated conductors.

11. A telecommunication cable comprising a multiplicity of insulated conductors, each conductor comprising a conductor wire composed of an aluminium alloy consisting of between 98.0 and 99.5 weight percent aluminium; between 0.3 and 1.0 weight percent iron; between 0.16 and 1.2 weight percent silicon; and trace quantities of conventional impurities, a waterproof sheath enclosing the insulated conductors and, filling the interstices between these insulated conductors and between them and the cable sheath from end to end of the cable length, a water-impermeable medium of a grease-like nature.

12. A telecommunication cable as claimed in claim 11, wherein the insulation of each conductor is a plastics material of cellular form.

13. An overhead electric conductor comprising at least one stranded layer of wires, wherein at least some of the wires are composed of an aluminium alloy consisting of between 98.0 and 99.5 weight percent aluminium; between 0.3 and 1.0 weight percent iron; between 0.16 and 1.2 weight percent silicon; and trace quantities of conventional impurities.

14. An overhead electric conductor comprising a core of metallic elements of high tensile strength and, surrounding the core, at least one stranded layer of wires each composed of an aluminium alloy consisting of between 98.0 and 99.5 weight percent aluminium; between 0.3 and 1.0 weight percent iron; between 0.16 and 1.2 weight percent silicon; and trace quantities of conventional impurities.

* * * * *